US008655865B1

(12) United States Patent
Sankaran et al.

(10) Patent No.: US 8,655,865 B1
(45) Date of Patent: Feb. 18, 2014

(54) METHOD AND APPARATUS FOR INDEXING RICH INTERNET CONTENT USING CONTEXTUAL INFORMATION

(75) Inventors: Srikumar Sankaran, Bangalore (IN); Naga Sateesh Kumar Busam, Bangalore (IN); Jeetu Narayan, Hyderabad (IN); Sundaresan Krishnan Meenakshi, Bangalore (IN); Thangaraj Umapathy, Bangalore (IN); Kapil Raja Durga, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 286 days.

(21) Appl. No.: 13/117,822

(22) Filed: May 27, 2011

(51) Int. Cl.
*G06F 17/30* (2006.01)
(52) U.S. Cl.
USPC ............................................................ 707/711
(58) Field of Classification Search
USPC ............................ 707/706, 741, 711, 802, 803
See application file for complete search history.

(56) References Cited

U.S. PATENT DOCUMENTS

| 6,470,329 | B1 * | 10/2002 | Livschitz | 1/1 |
| 7,536,672 | B1 * | 5/2009 | Ruehle | 717/101 |
| 8,280,884 | B2 * | 10/2012 | Greenfield et al. | 707/736 |
| 8,356,253 | B2 * | 1/2013 | Greer et al. | 715/762 |

OTHER PUBLICATIONS

Matias Urbieta, Gustavo Rossi, and Jeronimo Ginzburg, "Designing the Interface of Rich Internet Applications", Fifth Latin American Web Congress, IEEE, 2007, pp. 144-153.*

* cited by examiner

*Primary Examiner* — Cheryl Lewis
(74) *Attorney, Agent, or Firm* — Moser Taboada (57) ABSTRACT

A method and apparatus for facilitating indexing of rich Internet content by accessing a portion of rich Internet content containing a plurality of states and a plurality of transitions that connect various ones of the plurality of states through activation of at least one entity. The method and apparatus accesses contextual information coupled to at least one of a transition, a state or an entity, and examines at least one of the plurality of states using the at least one of the plurality of transitions and the contextual information.

20 Claims, 10 Drawing Sheets

METHOD AND APPARATUS FOR INDEXING RICH INTERNET CONTENT USING CONTEXTUAL INFORMATION

BACKGROUND

1. Technical Field

Embodiments of the present disclosure generally relate to a search engine support system and, in particular, to a method and apparatus for indexing rich Internet content using contextual information.

2. Description of the Related Art

The rapid proliferation of multimedia content (e.g., user interactive controls and application generated controls that create an exciting and interesting multimedia experience) throughout the Internet was caused by numerous technological innovations. Accordingly, such multimedia content may be referred to as rich Internet content with which users spend a significant amount of time conducting various activities (e.g., surfing educational websites, viewing detailed product demonstrations, accessing digital libraries and participating in expert discussion forums related to the multimedia content). Rich Internet content includes video, audio, text, animation, and combinations thereof. These users often download and view the rich Internet content on various display devices (e.g., a mobile phone, an electronic book reader, a Personal Digital Assistant (PDA), a hand-held gaming device and/or the like from various Internet resources (e.g., web pages, multimedia clips and/or content, emails and/or the like).

Rich Internet Applications (RIAs) provide interactive functionality for the rich Internet content. Consequently, RIAs have become a very popular multimedia tool on websites throughout the Internet. An RIA typically is a collection of rich Internet content that is wrapped within programming code to be executed by a playback routine. For example, some RIAs may comprise animations, interfaces, games, video clips, audio clips, and/or other interactive or passive content (referred to herein as "rich Internet content"). In addition, an RIA typically includes program code to instruct a playback routine (referred to as an "RIA Player") regarding how to display and progress through the content of the RIA. One such RIA Player is a FLASH player (from Adobe Systems Incorporated) that executes an RIA in the form of a SWF file to present rich Internet content to a viewer. A SWF file format is defined by the SWF File Format specification (version 10) as published, at http:www.adobe.com/devnet/swf/pdf/swf_file_format_v10.pdf, by Adobe Systems Incorporated of San Jose, Calif.

Internet search engines desire to index the rich Internet content for the purpose of enabling Internet users to locate and access the rich Internet content (e.g., web page menus, SWF files and/or the like) from home computers and/or mobile devices. For example, activating certain items (e.g., buttons, links and/or the like) of a web page menu generates a web effect or loads text and/or video. As such, indexing applications can traverse the RIAs to index rich Internet content. Often, during the indexing process, the rich Internet content is restarted numerous times.

Currently, the rich Internet content is loaded, advanced for certain duration (i.e., a stabilization time) until a stable point is reached (i.e., a state). The state is scanned for any interactive entities (e.g., buttons or sprites) for which events have been registered, which are identified as new transitions. The indexing application then chooses a particular transition and generates an event on the corresponding interactive entity by simulating a selection (e.g., a mouse click, touch screen contact, and the like). The rich Internet content is advanced to arrive at a new state. The list of transitions taken from the initial state to the current state is called a transition path. The indexing application must stop at the current state and restart the rich Internet content to choose a different transition path if, for example, the current state has no transitions or, if a depth at which the current state is present is beyond a pre-configured value where the depth is a value that refers to a number of transitions taken from the initial state to reach the current state. Such a process is repeated until each and every state is visited and there are no new transitions or when a predefined time limit has been reached.

Current indexing applications (e.g., Adobe FLASH Search) are solutions for search engines to extract data from within rich Internet content (e.g., FLASH content) by dynamically traversing through the states. These applications implement various traversal techniques in a module (e.g., a Virtual User Module (VUM)) that simulates actions typically performed by a user when browsing through the content. Current solutions compare a display list of the currently reached state with the states that have already been traversed. If both are found to be same, then the current state is marked as previously traversed earlier and the current solutions continue with the next transition. Such indexing techniques can lead to looping within an RIA (e.g., ping-ponging between states and/or repeating list traversals).

Currently, searching of rich Internet content involves following different transition paths and then, simulating events on all of the interactive entities. This requires triggering multiple events and may also require restarting the rich Internet content and taking different paths. The problem with the current approach is that the selection of interactive entities for generating the events, and comparison of states to identify if a state has been visited already is performed in an ad-hoc manner. A significant amount of computing power and time is spent restarting and in triggering events. To reduce these inefficiencies, it is necessary to avoid redundancy by determining whether a transition path will result in a state that has been previously followed and/or if a newly reached start has already been traversed.

Therefore, there is a need in the art for a method and apparatus for indexing rich Internet content.

SUMMARY

Various embodiments of the present disclosure generally comprise a method and apparatus for facilitating indexing of rich Internet content by accessing a portion of rich Internet content containing a plurality of states and a plurality of transitions that connect various ones of the plurality of states through activation of at least one entity. The method and apparatus accesses contextual information coupled to at least one of a transition, a state or an entity, and examines at least one of the plurality of states using the at least one of the plurality of transitions and the contextual information.

While the method and apparatus for indexing rich Internet content using contextual information is described herein by way of example for several embodiments and illustrative drawings, those skilled in the art will recognize that the method and apparatus for indexing rich Internet content using contextual information is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for indexing rich Internet content using contextual information are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and apparatus for indexing rich Internet content using contextual information by traversing all the states of the rich Internet content and utilizing contextual information to guide the traversal process. The contextual information is coupled to various states, transitions and entities of the rich Internet content such that, as the rich Internet content is traversed, the contextual information associated with a particular state, transition or entity is accessible from memory upon the indexing process attaining the particular state, transition or entity. Through use of the contextual information during indexing, the indexing process is rapid and is less error prone as compared to prior indexing techniques.

Figure 1:
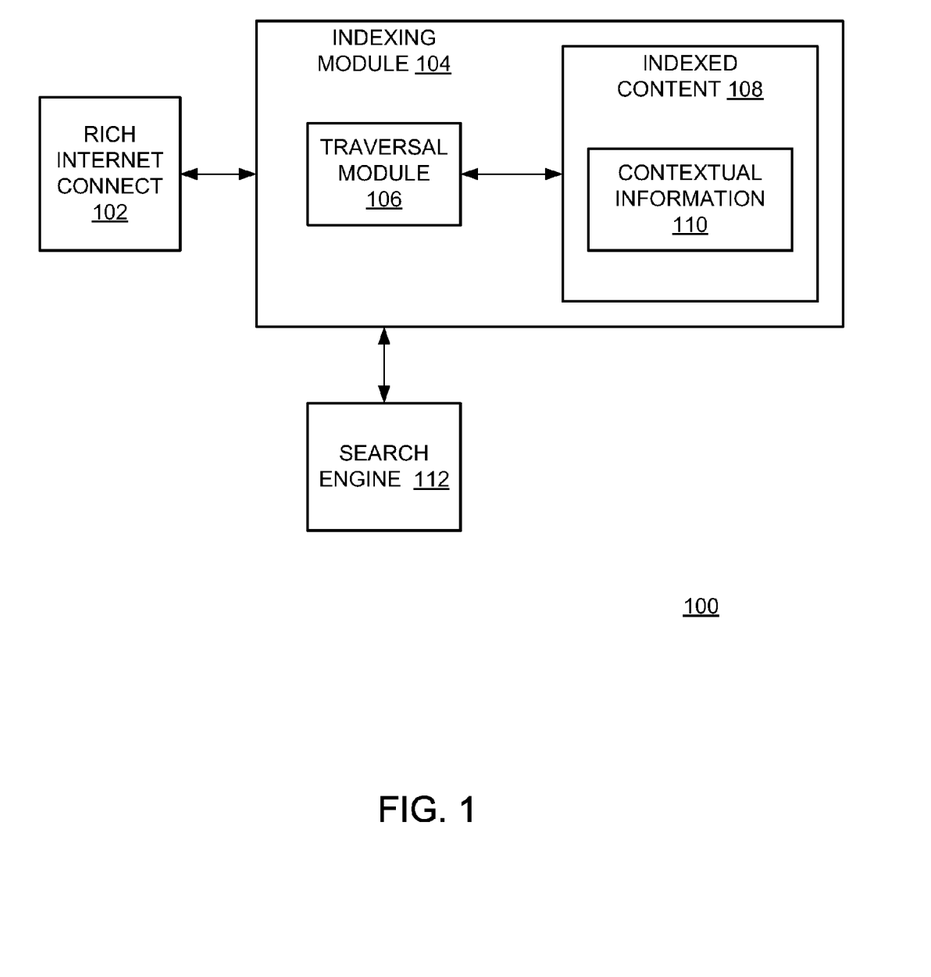
FIG. 1 is a functional block diagram of an apparatus for indexing rich Internet content using contextual information according to one or more embodiments.

FIG. 1 is a functional block diagram of an apparatus 100 for indexing rich Internet content 102 using contextual information 110 according to one or more embodiments. Contextual information 110 comprises various data associated with various transitions and/or states of the rich Internet content 102. Entities are selectable, interactive elements within the rich Internet content that facilitate progression of the content from a state to a transition. The entity may be selectable via user interaction or through software interaction. In some embodiments, the contextual information 110 includes a priority value indicating a number of times a particular entity (e.g., an interactive entity, such a button or sprite) in a current state has been activated in any state. For each state, the contextual information 110 also indicates which entities are new to the current state. The apparatus 100 includes an indexing module 104 for transforming the rich Internet content 102 into indexed content 108 having the contextual information 110. The apparatus 100 further includes a search engine 112 for requesting and extracting the indexed content 108

As explained further below, the indexing module includes a traversal module 106 that performs a process during which contextual information from transitions within a current state of the rich-internet content 102 is compared with contextual information from other states and/or from different rich Internet content according to some embodiments. The indexed content 108 includes the contextual information 110 that matches the contextual information that is generated for the rich Internet content 102. Hence, one or more states of the indexed content 108 match and/or resemble the current state of the rich Internet content 102.

In some embodiments, the traversal module 106 includes processor-executable instructions in the form of software, hardware and/or firmware that utilize measured heuristics for improving indexing of the rich Internet content 102. The traversal module 106 identifies different stable locations or states at which there are potential branches or transitions in the execution based on user input. The traversal module 106 advances through the states by simulating different events so that alternative paths (i.e., transition paths) are traversed. In some embodiments, the traversal module 106 examines and records various data (e.g., text, such as Uniform Resource Locators (URLs)) associated with each state.

Using the contextual information 110, the traversal module 106 examines the priority values and selects the entity (e.g., a button) that has been activated (e.g., selected) a least number of times and therefore, is newest to the current state. The traversal module 106 continues activating newer entities and traversing newer paths instead of examining older ones.

While triggering events on entities, the traversal module 106 may examine a previously visited state. In other embodiments, the traversal module 106 prevents revisiting states using a state matching process and the contextual information 110. In order to traverse the rich Internet content 102, the traversal module 106 selects various transitions at one or more states. The traversal module 106 may apply various heuristics (e.g., prioritization) to select an entity that results in a more efficient traversal process as explained further below.

Once the traversal module 106 arrives at a current state, the traversal module 106 can compare all the previously visited states with the current state using the contextual information 110. Two states match when each and every transition in both states have a one-to-one mapping between the contextual information 110 of each state. If two states have the same number of entities with events associated with them or similar context information for all buttons in both states, then the state is not a new state. Such a state matching process is advantageous over other methods, such as blind display list matching, which fails in many cases. For example, when a simple animation has added dummy elements to a display list without actually changing anything useful, blind display list matching may fail. The traversal module 106, on the other hand, identifies such a state as a duplicate state, which avoids unnecessary iterations and saves time. Two states also match if an active path of a map matches for both states according to some embodiments. The active path is a sub-path that refers to a display list having only those entities that are either entities (e.g., buttons) themselves or have an entity as a child.

In some embodiments, the traversal module 106 identifies entities without contextual information 110. If there is no contextual information 110 for a certain entity, the traversal module 106 creates a tag for that entity to identify the entity within the index as having no contextual information. If the rich Internet content is restarted, a new tag is created and coupled again to the entity. Whenever a new state is encountered after tagging all new entities, a display list is recorded along with the tags as the contextual information 110. When the rich Internet content is restarted after traversing a new path, a sub-path will already have been traversed. Each state along the sub-path has already been encountered, and buttons are re-tagged with the same contextual information 110 as before to maintain consistency.

In some embodiments, the traversal module 106 computes a unique hash code (i.e., value) based on various characteristics associated with an entity, such as location, content and/or name of a transition (e.g., interactive entities on menus built using FLASH). The hash provides a simple numeric representation for the entity. The traversal module 106 builds a map (e.g., a data table) including hash codes of the traversed entities, which are stored in the contextual information 110. Whenever the traversal module 106 identifies a new transition, the traversal module 106 computes a unique hash code that is compared with hash codes of previously traversed entities. In some embodiments, if the new transition has already been traversed (i.e., a matching hash code is found), the traversal module 106 assigns a lower priority value and proceeds to other higher priority entities.

The traversal module 106 selects the next entity to visit using various prioritization techniques. For each entity, the traversal module 106 computes a hash code, which includes some or all of the following: a name, a position of the entity as well as text that is present inside the entity button or sprite. Such text may be extracted from children of type TEXT in a sub-tree associated with a sprite. For embodiments using buttons, the traversal module 106 extracts the text by having a sprite with a text child and a button which is selectable inside that sprite. The traversal module 106 determines whether a sprite is present and follows a same path as that of the sprite.

In some embodiments, the traversal module 106 executes a dynamic prioritization process during which the traversal module 106 determines if a selected entity could result in a state where no text or very little text can be retrieved or if the entity is already selected, such as a repeated menu item in FLASH content websites). Since the indexing module 104 desires maximum possible contextual information 110 extraction from rich Internet content within a given time period penalizing a transition that exhibit such behavior results in numerous advantages.

In some embodiments, the traversal module 106 uses the priority values (e.g., button selection counts) stored in the contextual information 110 to determine whether the selectable entity could result in a state of little or no retrievable content. After executing specific actions (e.g., view full screen, request URL with a web browser as target, change volume, play/pause/stop data stream and/or the like), the traversal module 106 stores data related to these actions in the contextual information 110. If an entity that is likely to result in a same action appears in a subsequent state, a priority values for that entity is lowered (i.e., penalized) because such a transition will not lead to a state providing new text.

For objects (e.g., event handlers) that are dynamically generated every time an entity is activated, determining whether a certain object corresponds with a previous state involves using a hash code computed using priority values and stored in the contextual information 110 according to various embodiments. Before any entity is traversed, the contextual information 110 is examined to see if the entity has been blacklisted and a priority value is lowered accordingly. As another example, if a new event handler is created, any dynamic priority value (e.g., selection count) stored in the contextual information 110 is reset plus the previous event handler is removed from the contextual information 110.

Figure 2A:
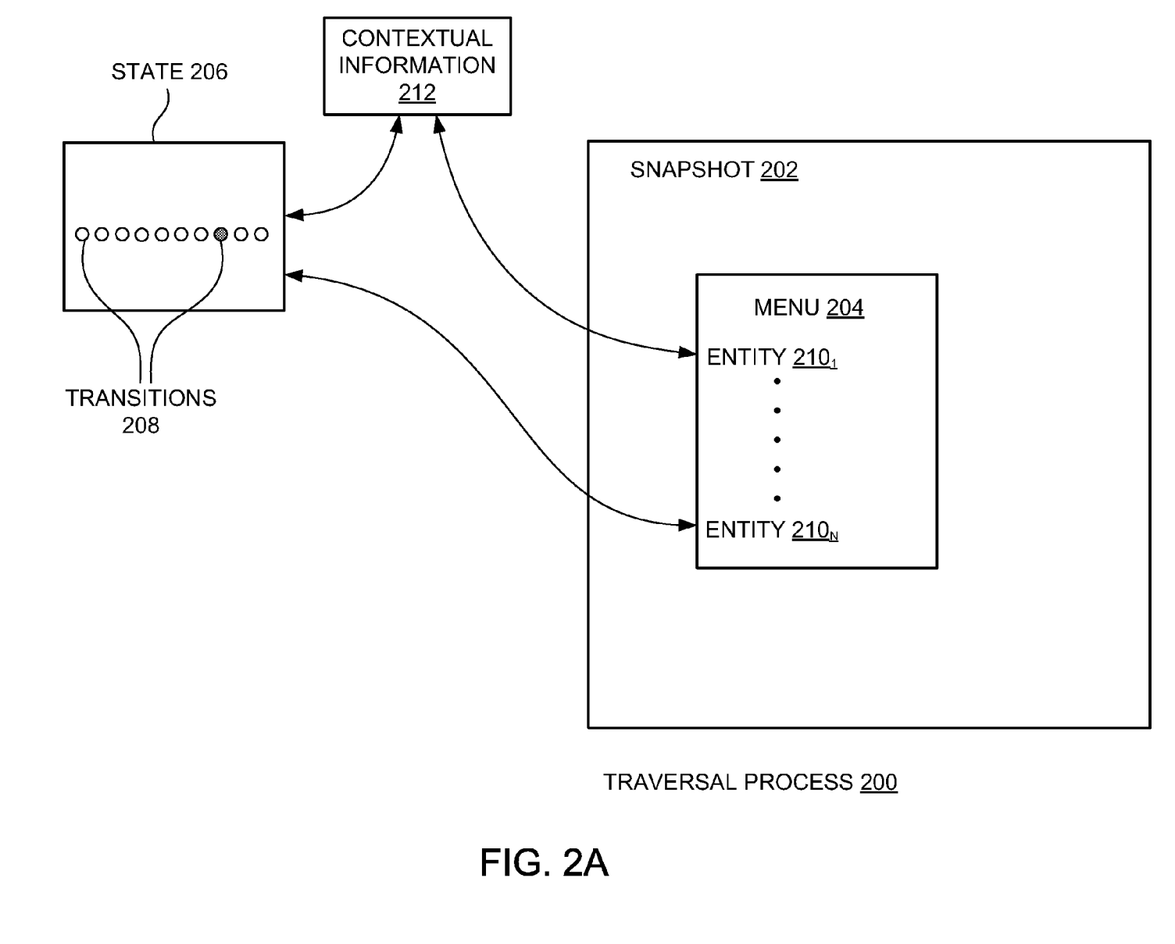
FIGS. 2A-E illustrate a traversal process may be performed by the apparatus of FIG. 1 according to one or more embodiments.

FIGS. 2A-E illustrate a traversal process 200 that may be performed by the apparatus of FIG. 1 according to one or more embodiments. FIG. 2A illustrates a portion of the traversal process 200 depicting a snapshot 202 after a portion of a stabilization time period. The rich Internet content includes a menu 204. A stable point after browsing the menu 204 is captured by the snapshot 202. A state 206 represents the snapshot 202 and includes a plurality of transitions 208 that represent entities 210, which are interactive menu 204 items.

It is appreciated that while the following description for FIGS. 2A-E may refer one of the entities 210 as either a button or a sprite that are associated with specific events, other embodiments may use other forms of interactive entities that may be triggered using various techniques. In addition, the following description describes embodiments where the snapshot 202 refers to a state of rich Internet content and the menu 204 is built is using a rich Internet application, but it is envisioned that other forms of multimedia content and related platforms are applicable to other embodiments. For example, the menu 204 may include FLASH content.

As explained further below, the traversal process 200 proceeds to examine the menu 204 and couple contextual information 212 to the entities 210. The snapshot 202 is analyzed to determine whether the state 206 has already been reached from a different path or if the state 206 is a new state. The traversal process 200 selects one of the entities 210 (e.g., a button). In some embodiments, the traversal process 200 uses the contextual information 212 to avoid triggering certain ones of the entities 210. For example, buttons that have been selected already in a different state should not be selected again. The traversal process 200 should also decrease a number of times the rich Internet content is restarted since restarting and advancing take considerable amount of time.

Once the traversal process 200 reaches the state 206, an associated action handler is activated. In some embodiments, the action handler includes information (e.g., properties) that determines which action to perform in response to a certain event being triggered. The traversal process 200 analyzes the information in order to calibrate priority values, which can be assigned to these entities and influence the traversal order. As an example, in full RIA-containing websites, the entities 210 are repeated transitions at every state along a path. Even after a transition has been triggered, the traversal process 200 identifies the repetition in other states.

Indexing of rich Internet content requires examination of a display list, which defines the entities 210 currently displayed on screen. On a particular event (e.g., button selection event), state change happens by modifying the display list. The traversal process updates the contextual information 212 by adding new entities to the state 206 while removing some of the older ones and keeper other ones of the entities 210. By tagging all the entities 210, to the traversal process 200 may identify which entities are new transitions and which entities existed in a previous state. Thus, the contextual information 212 refers to a tag that is added to the state 206 to describe all of the entities in a current display list. The tag also stores the information as to the number of times the particular button was selected, which is described further below for FIG. 2B.

The hash code computed above is tagged along with the transition structure. Now whenever a transition is traversed to index the alternate paths, the process 200 stores the hash code of the transition in a global map. The global map is examined whenever a new transition needs to be traversed. If the process 200 finds a matching hash code in the global map, then a priority value of the transition is lowered and the traversal process 200 proceeds to a next transition. The traversal process 200 does not completely ignore the transition. Instead, the traversal process 200 penalizes the transition for resembling a previously traversed transition. Another heuristic that is used is a priority value that is based on a name of the entity associated with the selected transition. If text within the entity matches a pre-defined list (e.g., "Close", "Submit", "Back", "To" and/or the like), then the traversal process 200 lowers the priority values.

If an insignificant amount of text is within the entity, then the traversal process uses instance names in computing the hash codes according to some embodiments. As an example, the traversal process 200 may not use the text when indexing web sites where the entities 210 are moved around to generate a new display. Once the higher priority transitions are covered and if a stabilization time period has not elapsed (e.g., a cut-off time is not reached), the traversal process 200 performs a second traversal to examine the lower priority transitions. If a significant number of the lower priority transitions match previously traversed states, the traversal process 200 concludes indexing. Otherwise, the traversal process 200 continues indexing the menu 204 until the stabilization time period elapses.

Figure 2B:
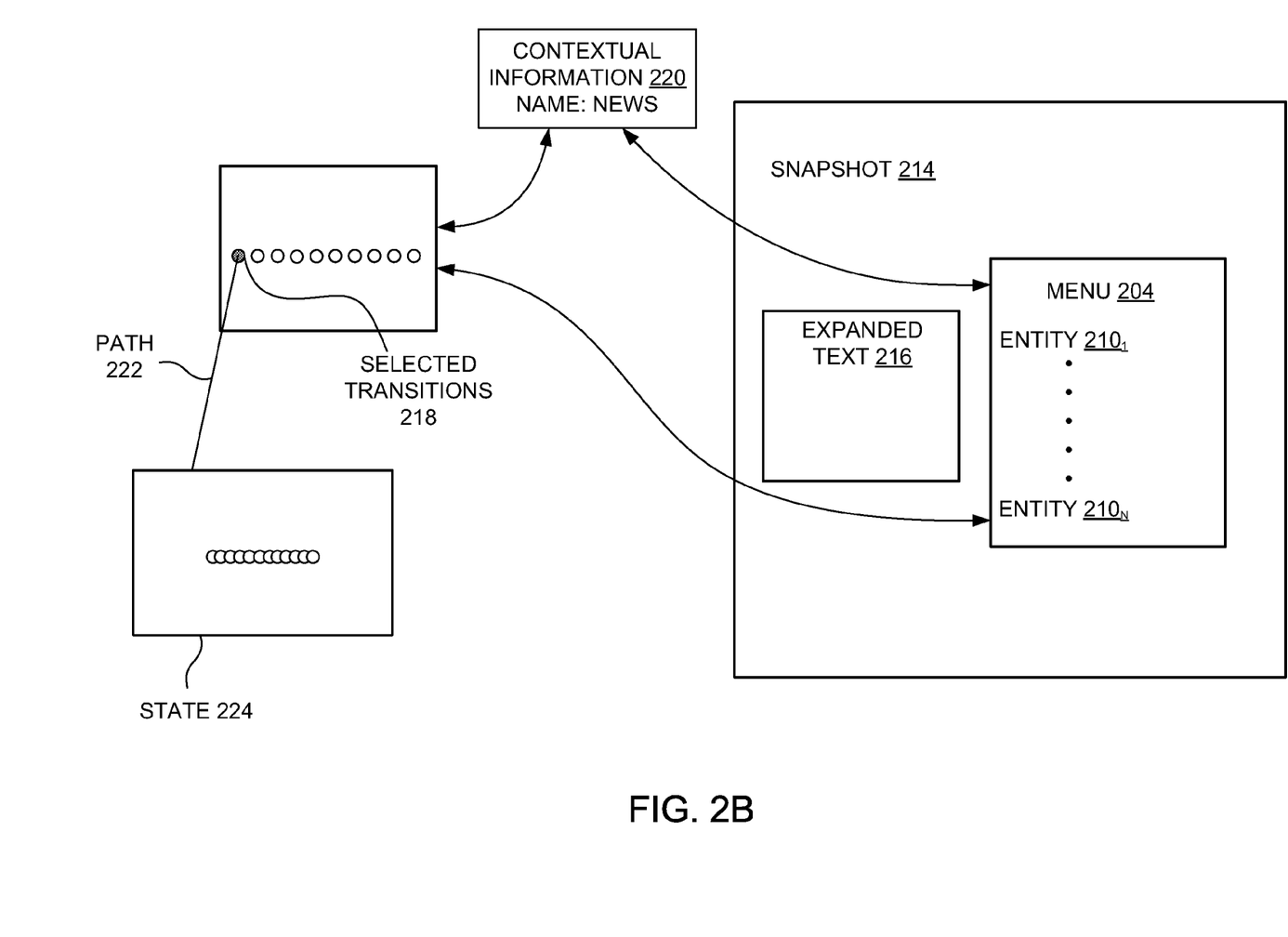

FIG. 2B illustrates a portion of the traversal process 200 after selecting one of the entities and advancing to another stable point captured as a snapshot 214. The selection event causes generation of expanded text 216 as depicted in FIG. 2B. Furthermore, the menu 204 is repeated at every state. Selecting one of the entities 210 will result in a new state where all the entities 210 are displayed again.

The traversal process 200 selects a highest priority transition, such as a selected transition 218, based on the contextual information 220. As mentioned above, hash codes are compared and used to determine that a particular transition has been previously traversed. Once it is determined that the selected transition 218 has been previously traversed, the contextual information 220 that corresponds with the selected transition 218 is examined. Alternatively, if the selected transition 218 is new, the contextual information 220 is populated with initial data. As illustrated, the name of the entity 210 associated with the selected transition is "NEWS" and stored in the contextual information 220. Hence, the snapshot 214 is a result of activating the selected transition 218 for "NEWS" on the state 206 and following a path 222 to state 224.

Figure 2C:
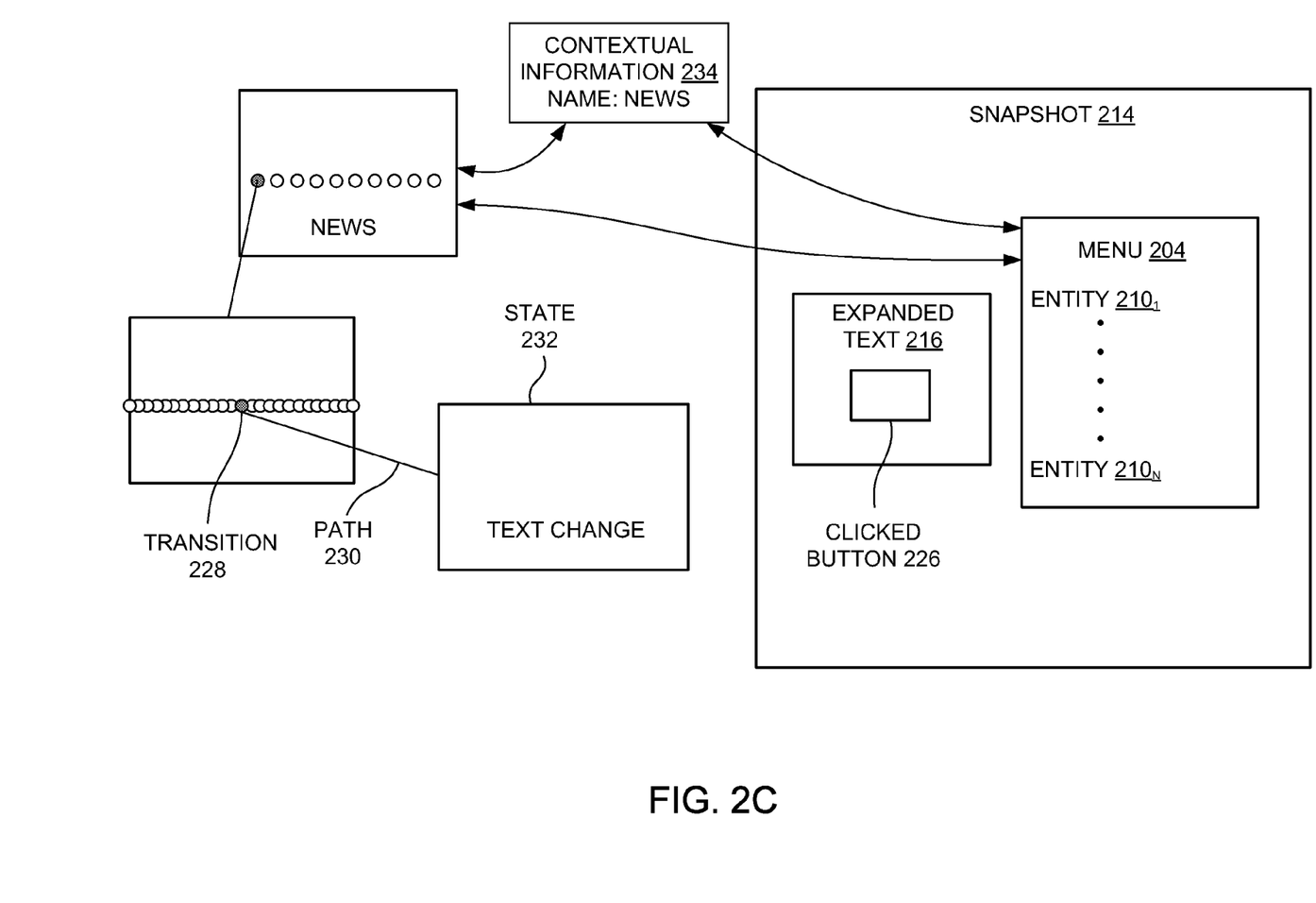

FIG. 2C illustrates a portion of the traversal process 200 that occurs after selecting another entity in the snapshot 214 according to some embodiments. The traversal process 200 determines which entities are repeated and selects an entity having a highest priority (e.g., newest in a state), such as selected button 226. FIG. 2C diagrammatically represents such an event as the selection of a transition 228 on the state 224, which creates a path 230 leading to a state 232. Contextual information 234 associated with the selected button 236 indicates that such a transition is not new and/or leads to the state 232 where relevant text changed. Such a text change may be significant and result in a new state. Alternatively, the text change may be very small and, accordingly, very little or no text is retrievable from the state 232.

Figure 2D:
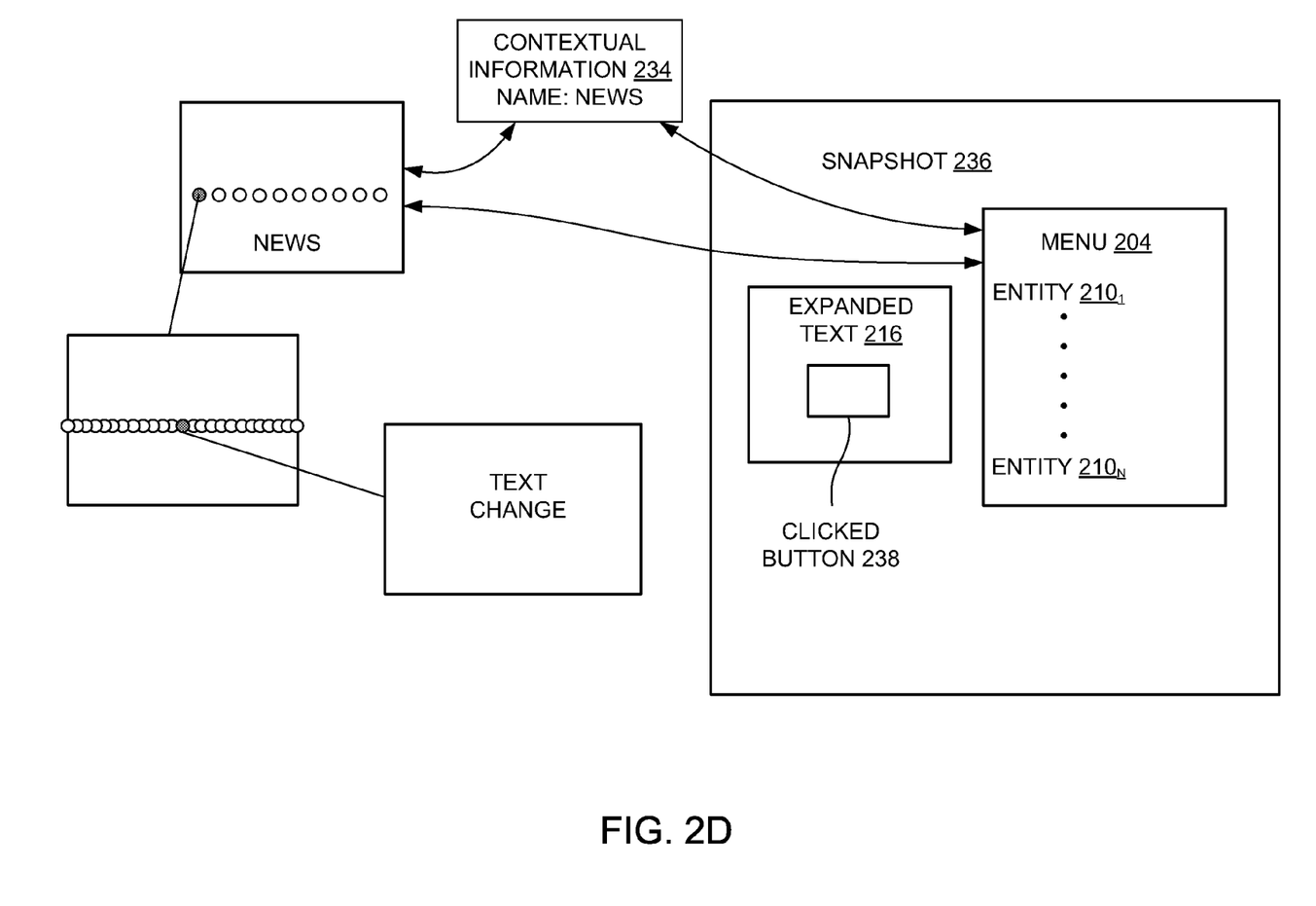

FIG. 2D illustrates a portion of the traversal process 200 that occurs after triggering the selected button 226 and advances to a stable point represented by snapshot 236 according to various embodiments. In some embodiments, the snapshot 236 represents the state 232 and includes changed text 238. If the changed text 238 is small and insignificant, the state 232 is a repeated state and there is no need to modify the contextual information 234 associated with the transition 228.

Figure 2E:
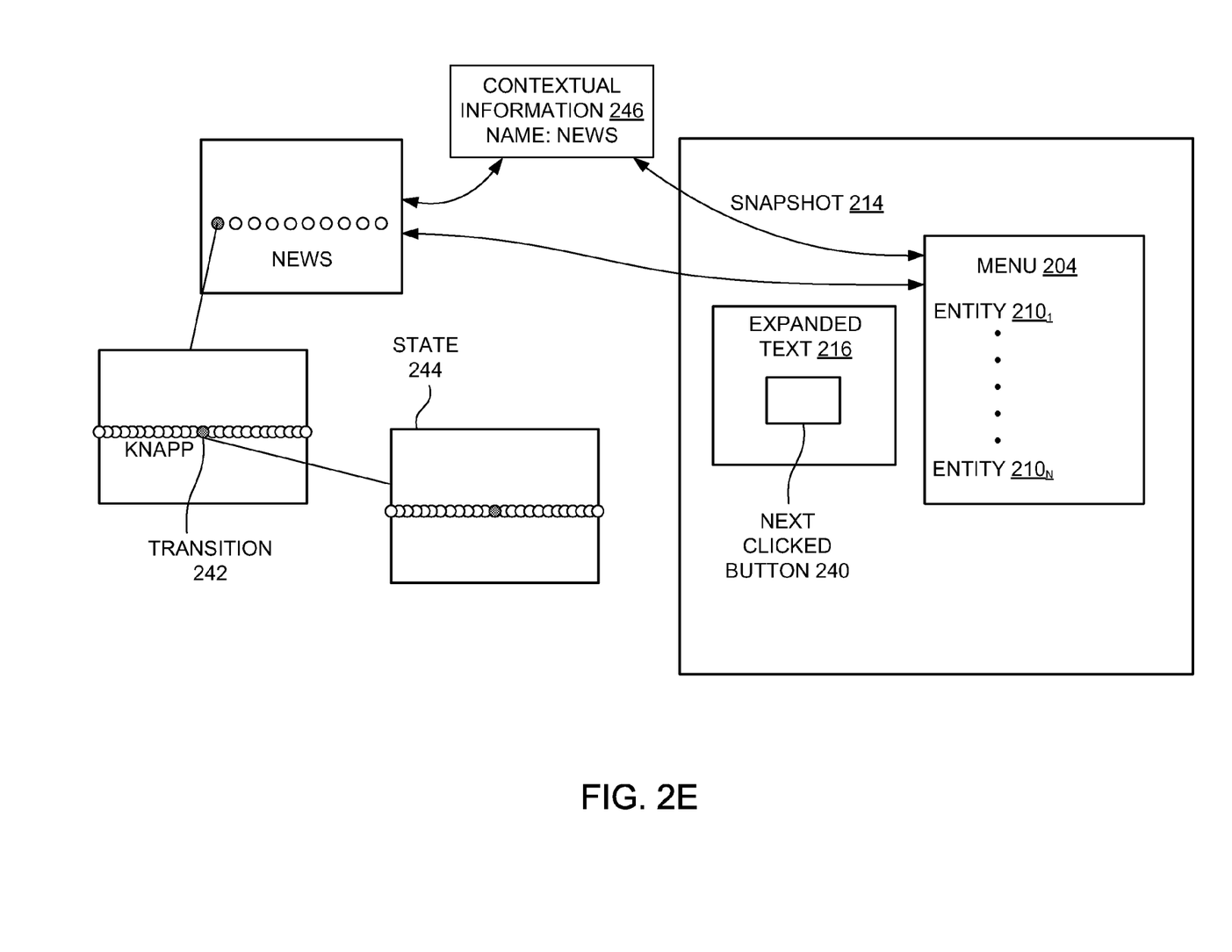

FIG. 2E illustrates a portion of the traversal process 200 that returns to the state 224 and activates another entity according to various embodiments. FIG. 2E represents a selection of a next selected button 240 with a transition 242, which results in a state 244. Contextual information 246 is coupled to the transition 242 and indicates a priority value and a hash code for the selected button 240. Because of such data, the traversal process 200 may advance to a stable point represented by the state 244 without restarting the rich Internet content. Furthermore, the traversal process 200 reduces time and computing resources spent traversing unproductive transition paths and infinite looping.

Figure 3:
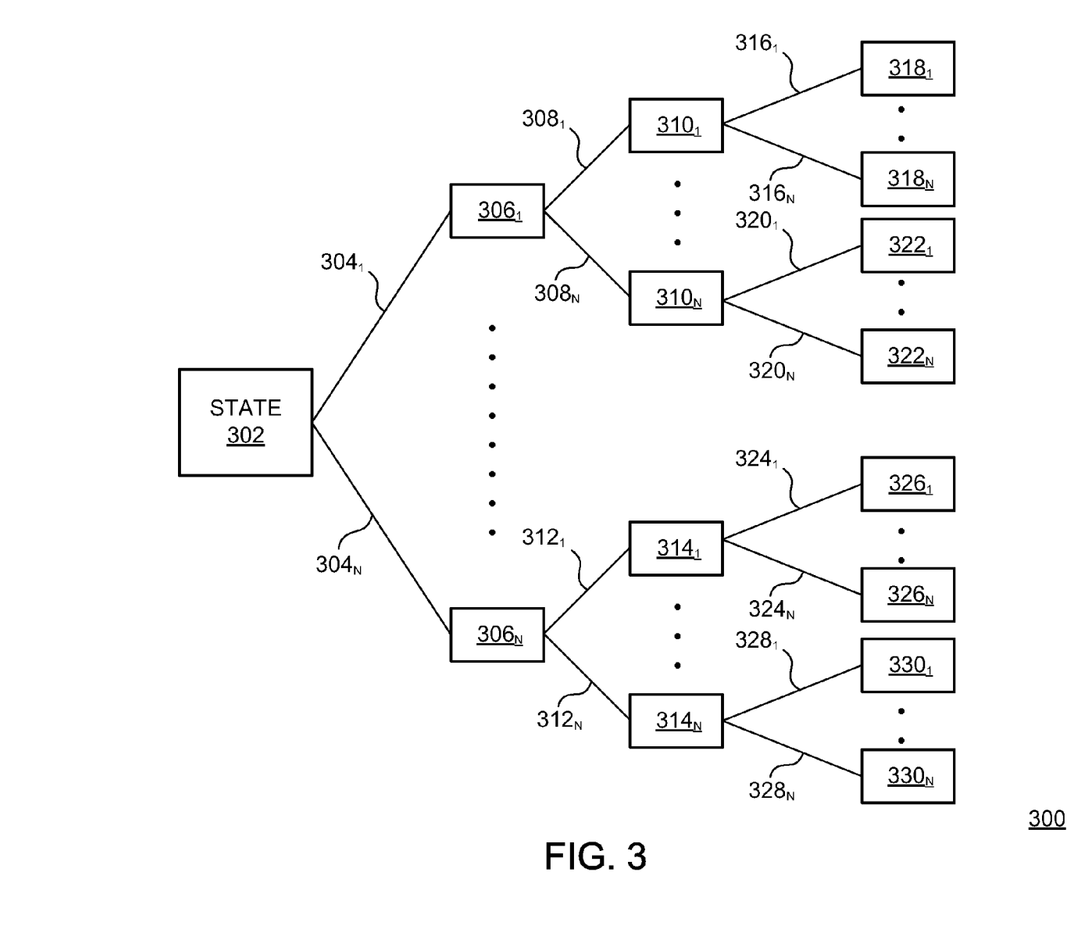
FIG. 3 diagrammatically illustrates a map having a plurality of states and a plurality of transitions for rich Internet content as may be generated by the indexing module of FIG. 1 according to one or more embodiments.

FIG. 3 diagrammatically illustrates a map 300 having a plurality of states and a plurality of transitions for rich Internet content as may be generated by the indexing module of FIG. 1 according to one or more embodiments. As explained in the present disclosure, the map 300 may be generated while traversing rich Internet content to create an index.

The indexing module 104 operates on the concept of states and transitions. Any stable point during the playback of the rich Internet content (e.g., FLASH content, such as a SWF file) is called a state. Any selectable entity in a state is called a transition. While indexing, these applications start from a root state and activate the events on the transitions. An event generation on a particular transition can result in new state with a different set of transitions. So in effect the traversal of the rich Internet content results in the map depicting states with transitions.

The map 300 depicts a state 302 constituting a root state that is connected to each and every other state via one or more transitions. Via a plurality of transitions 304, the root state 302 connects with a plurality of states 306. As illustrated, following any of a plurality of transitions 308 will lead to a particular one of a plurality of states 310. Similarly, following any of a plurality of transitions 312 from state 306N to a particular one of a plurality of states 314. Following a plurality of transitions 316 leads to a plurality of states 318. Following a plurality of transitions 320 leads to a plurality of states 322. Following a plurality of transitions 324 leads to a plurality of states 326. Following a plurality of transitions 328 leads to a plurality of states 330.

In order to prevent infinite loops during indexing, contextual information for any state that has been previously traversed must be examined to determine whether such a state is a result of following a transition different path or is a new state. For example, if a button in a first state results in a second state and another button in the second state results in the first state, then the traversal module 106 does not select the button again after returning to the first state.

In some embodiments, the traversal module 106 restarts the rich Internet content and follows a new path by using the contextual information. For example, if a particular path starts from a first state, the traversal module 106 selects a first button and arrives at a second state. Then, the traversal module 106 selects a second button and arrives at a third state. Subsequently, the traversal module 106 selects a third button and arrives at a fourth state. Using the contextual information, the traversal module 106 determines that the third button exists in the first state and reduces the path comprising three steps into a single step path.

Figure 4:
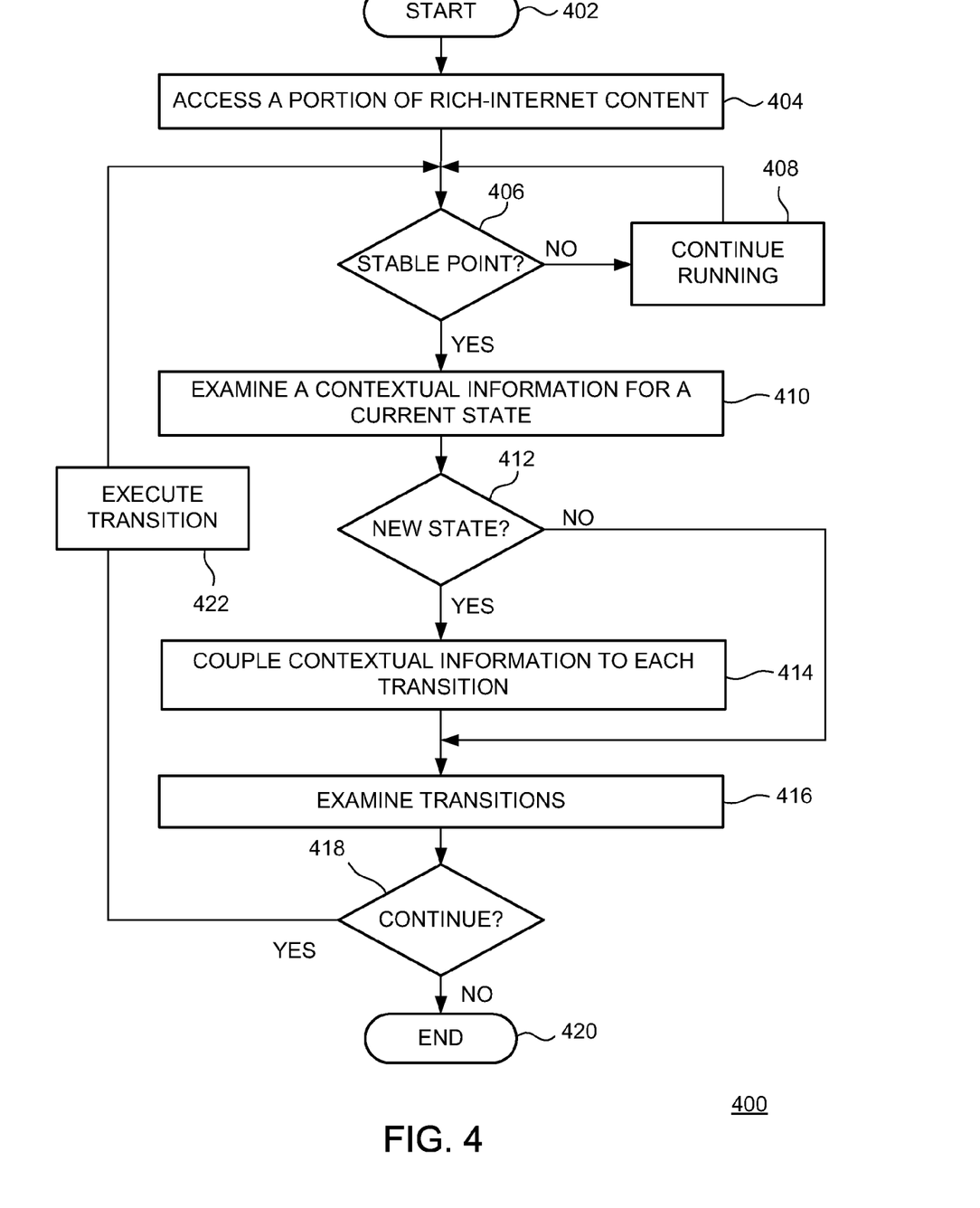
FIG. 4 is a flow diagram of a method for indexing rich Internet content using contextual information as may be performed by the indexing module of FIG. 1 according to one or more embodiments.

FIG. 4 is a flow diagram of a method 400 for indexing rich Internet content using contextual information as may be performed by the indexing module of FIG. 1 according to one or more embodiments. In some embodiments, each and every step of the method 400 is performed by a traversal module (e.g., the traversal module 106 of FIG. 1). In other embodiments, one or more steps are skipped or omitted. The method 400 starts at step 402 and proceeds to step 404.

At step 404, the method 400 accesses a portion of rich Internet content. In some embodiments, the method 400 runs the portion of the rich Internet content for a pre-defined time period or until a stable point is reached. At step 406, the method 400 determines whether the rich Internet content is at a stable point. If the rich Internet content is currently stable, the method 400 proceeds to step 410. If, on other hand, the method 400 is not stable, the method 400 proceeds to step 408. At step 408, the method 400 runs the rich Internet content until the stable point.

At step 410, the method 400 accesses and examines contextual information for a current state of the rich Internet content. The current state represents a display list of various data within the rich Internet content (e.g., URLs, text and/or the like) and includes transitions that lead to other states. These transitions include entities that may be activated at the current state. At step 412, the method 400 determines whether the current state is a new state. In some embodiments, the method 400 compares a hash code for the current state with the contextual information for all known states. If the current state is a new state, the method 400 proceeds to step 414. If the current state is not a new state, the method 400 proceeds to step 416.

At step 414, the method 400 couples contextual information to entities that are displayed at the stable point. The coupling process associates the contextual information with the entities (as well as transitions and/or states associated therewith) by memory address, pointer or the like, such that the contextual information is accessible from memory as needed during execution of method 400. As mentioned in the present disclosure, the method 400 assigns priority values where a lower priority value refers to a lower activation count (e.g., selection count). Thus, an entity having the lowest activation count has a highest priority and is selected as a next transition to follow according to some embodiments.

At step 416, the method 400 examines the entities associated with the current state. In some embodiments, the method 400 determines which of the entities have been previously traversed. In some embodiments, the method 400 selects a particular entity as a next transition. At step 418, the method 400 determines whether to continue indexing the rich Internet content. If the method 400 decides to continue indexing, the method 400 proceeds to step 422 to execute a transition and then returns to step 406. If the method 400 decides to stop indexing, the method 400 proceeds to step 420. At step 420, the method 400 ends.

Figure 5:
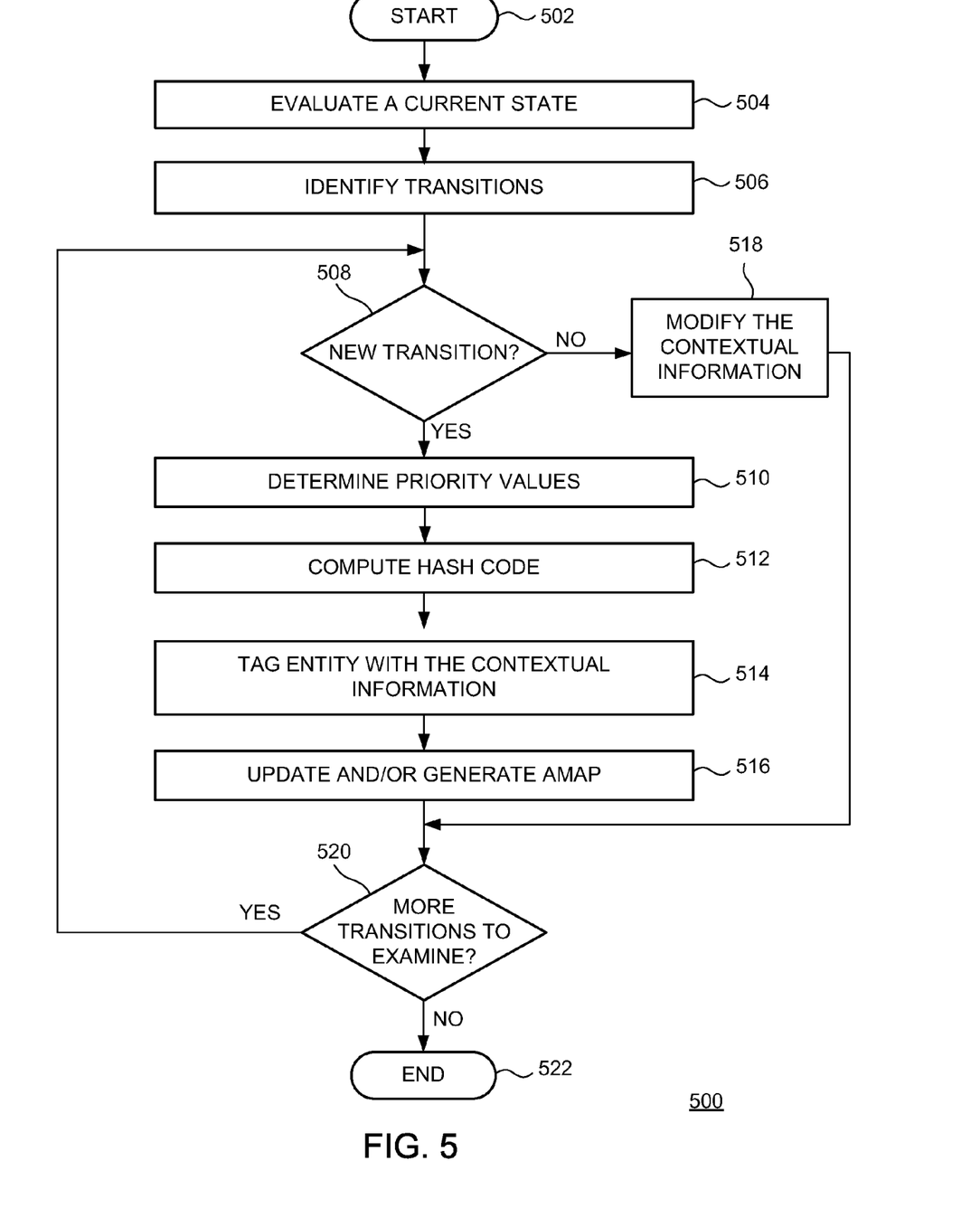
FIG. 5 is a flow diagram of a method for generating a map of FIG. 3 using the indexing module of FIG. 1 according to one or more embodiments.

FIG. 5 is a flow diagram of a method 500 for generating a map of FIG. 3 using the indexing module of FIG. 1 according to one or more embodiments. In some embodiments, each and every step of the method 500 is performed by a traversal module (e.g., the traversal module 106 of FIG. 1). In other embodiments, one or more steps are skipped or omitted. The method 500 starts at step 502 and proceeds to step 504.

At step 504, the method 500 evaluates a current state. At step 506, the method 500 identifies transitions on the current state. At step 508, the method 500 determines whether there is a new transition amongst the identified transitions. If a particular transition is a new transition, the method 500 proceeds to step 510. At step 510, the method 500 determines priority values for the new transition, which is stored as contextual information (e.g., the contextual information 212 of FIG. 2). At step 512, the method 500 computes a hash code for the new transition, which is also stored in the contextual information. At step 514, the method tags an entity that corresponds with the new transition with the contextual information. At step 516, the method 500 updates and/or generates an execution tree using the contextual information for the new transition. Hence, the execution tree represents global contextual information (e.g., the contextual information 110 of FIG. 1).

If, on the other hand, the particular transition has been previously traversed, the method 500 proceeds to step 518. At step 518, the method 500 modifies the contextual information associated with the particular transition. In some embodiments, the method 500 lowers a priority by increasing an activation count. As a result, it is less likely that the particular transition is traversed again during the indexing operation. At step 520, the method 500 determines whether there are more transitions to examine. If there are more transitions, the method 500 returns to step 508. If, on the other hand, there are no more transitions, the method 500 proceeds to step 522. At step 522, the method 500 ends.

Example Computer System

Various embodiments of a method and apparatus for indexing rich Internet content using contextual information, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement a traversal module (e.g., the traversal module 106 of FIG. 1) or an indexing module (e.g., the indexing module 104 of FIG. 1) as described above. While the illustrated system demonstrates computer system 600 implementing the traversal module, computer system 600 may be used to implement any other system, device, element, functionality or method of the above-described embodiments. In the illustrated embodiments, computer system 600 may be configured to implement the traversal module as processor-executable executable program instructions 622 (e.g., program instructions executable by processor(s) 610) in various embodiments.

Figure 6:
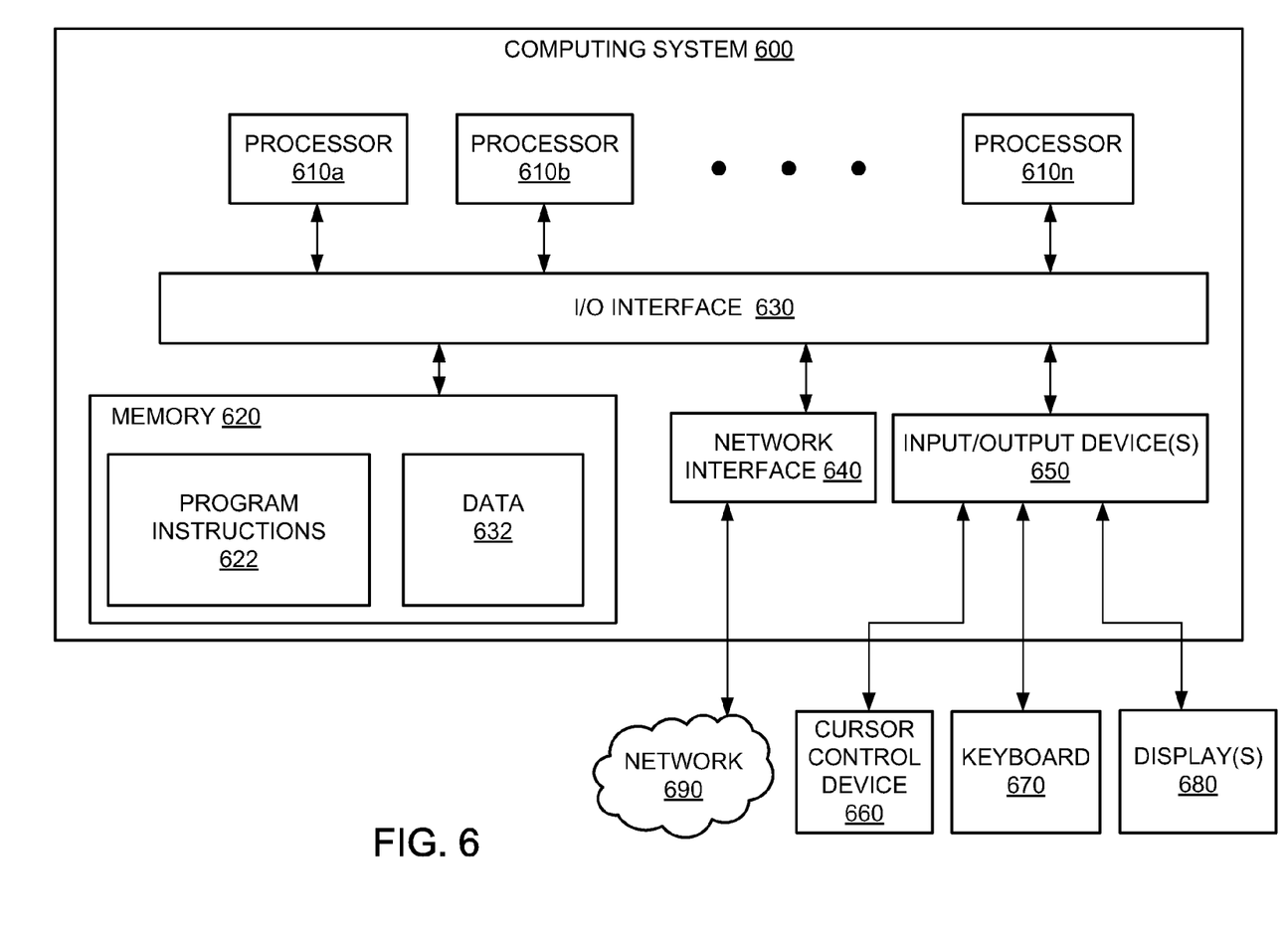
FIG. 6 is a schematic diagram of a computing system that can be used as an apparatus for indexing rich internet content using contextual information by execution the various functions represented by the modules of FIG. 1 according to one or more embodiments.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 630, such as cursor control device 660, keyboard 670, and display(s) 680. In various embodiments, any of components 630 may be utilized by the traversal module to receive user input such as rich Internet content (e.g., the rich Internet content 102 of FIG. 1) as described above. In various embodiments, a user interface (e.g., a user interface operating on the indexing module) may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x96, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610*a-n*. In various embodiments, system memory 920 may be implemented using any suitable memory technology, such as static random access memory (SRAM), synchronous dynamic RAM (SDRAM), nonvolatile/FLASH-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650, In some embodiments, I/O interface 630 may perform any necessary protocol, timing or other data transformations to convert data signals from one components (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 640), such as one or more external systems or between nodes of computer system 600. In various embodiments, network 640 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowcharts of FIGS. 4-5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for facilitating indexing of rich Internet content, comprising:
   accessing a portion of rich Internet content comprising a plurality of states and a plurality of transitions that connect various ones of the plurality of states through activation of at least one entity;
   accessing contextual information coupled to at least one of a transition, a state or an entity, wherein contextual information for an entity comprises a priority value indicating a number of times the entity in a current state has been activated in any state and a hash code computed based on at least one of a location, content, or name of the transition, and wherein contextual information identifies which entities are new transitions and which entities existed in a previous state; and
   examining at least one of the plurality of states using the at least one of the plurality of transitions and the contextual information.

2. The method of claim 1, wherein accessing a portion of the rich Internet content further comprises running the rich Internet content for a pre-defined time period.

3. The method of claim 1, wherein the hash code is computed based on various characteristics associated with a transition.

4. The method of claim 1 further comprising generating a map defining the plurality of states and the plurality of transitions.

5. The method of claim 1, further comprising coupling the contextual information to an entity while traversing a state using a transition associated with the entity.

6. The method of claim 5 further comprising, for at least one previously traversed transition, modifying the contextual information associated with the at least one previously traversed transition and the associated entity.

7. The method of claim 1 further comprising indexing the portion of the rich Internet content using the contextual information.

8. The method of claim 1, wherein accessing the contextual information further comprises for each state of the plurality of states, selecting a transition from the plurality of transitions based on the contextual information.

9. The method of claim 1 wherein contextual information comprises data regarding at least one of a state or a transition within rich Internet content.

10. An apparatus for facilitating indexing of rich Internet content, comprising:
    an indexing module for processing to rich Internet content, wherein the indexing module further comprises a traversal module for accessing a portion of rich Internet content comprising a plurality of states and a plurality of transitions that connect various ones of the plurality of states through activation of at least one entity; accessing contextual information coupled to at least one of a transition, a state or an entity, wherein contextual information for an entity comprises a priority value indicating a number of times the entity in a current state has been activated in any state and a hash code computed based on at least one of a location, content, or name of the transition, and wherein contextual information identifies which entities are new transitions and which entities existed in a previous state; and examining at least one of the plurality of states using the at least one of the plurality of transitions and the contextual information.

11. The apparatus of claim 10, wherein the traversal module runs the rich Internet content for a pre-defined time period.

12. The apparatus of claim 10, wherein the traversal module computes the hash code based on various characteristics associated with the each transition.

13. The apparatus of claim 10, wherein the traversal module generates a map defining the plurality of states and the plurality of transitions.

14. The apparatus of claim 10, wherein the traversal module couples the contextual information to an entity while traversing a state using a transition associated with the entity.

15. The apparatus of claim 14, wherein, for at least one previously traversed transition, the traversal module modifies the contextual information associated with the at least one previously traversed transition and the associated entity.

16. The apparatus of claim 10, wherein the traversal module indexes the portion of the rich Internet content using the contextual information.

17. The apparatus of claim 10 wherein contextual information comprises data regarding at least one of a state or a transition within rich Internet content.

18. A non-transitory computer readable medium for storing processor executable instructions that, when executed by a computing system, causes the computing system to perform a method comprising:

accessing a portion of rich Internet content comprising a plurality of states and a plurality of transitions that connect various ones of the plurality of states through activation of at least one entity;

accessing contextual information coupled to at least one of a transition, a state or an entity, wherein contextual information for an entity comprises a priority value indicating a number of times the entity in a current state has been activated in any state and a hash code computed based on at least one of a location, content, or name of the transition, and wherein contextual information identifies which entities are new transitions and which entities existed in a previous state; and examining at least one of the plurality of states using the at least one of the plurality of transitions and the contextual information.

19. The non-transitory computer readable medium of claim 18, wherein the method further comprises accessing a portion of the rich Internet content further comprises running the rich Internet content for a pre-defined time period.

20. The non-transitory computer readable medium of claim 18, wherein the contextual information comprises data regarding at least one of a state or a transition within rich Internet content.

* * * * *